(12) United States Patent
Suzuki (10) Patent No.: US 7,849,733 B2
(45) Date of Patent: Dec. 14, 2010

(54) MISFIRE JUDGING DEVICE OF INTERNAL COMBUSTION ENGINE, VEHICLE MOUNTED WITH IT AND MISFIRE JUDGING METHOD

(75) Inventor: Takashi Suzuki, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 408 days.

(21) Appl. No.: 12/086,638

(22) PCT Filed: Dec. 14, 2006

(86) PCT No.: PCT/JP2006/324922

§ 371 (c)(1),
(2), (4) Date: Jun. 17, 2008

(87) PCT Pub. No.: WO2007/072725

PCT Pub. Date: Jun. 28, 2007

(65) Prior Publication Data

US 2010/0218598 A1    Sep. 2, 2010

(30) Foreign Application Priority Data

Dec. 21, 2005    (JP) .............................. 2005-367752

(51) Int. Cl.
  *G01M 15/11* (2006.01)
(52) U.S. Cl. .................................................. 73/114.04
(58) Field of Classification Search .............. 73/114.02, 73/114.03, 114.04, 114.05
See application file for complete search history.

(56) References Cited

U.S. PATENT DOCUMENTS

| 5,442,955 A | * | 8/1995 | Baba et al. ................ 73/114.04 |
| 5,560,336 A | | 10/1996 | Takahashi et al. |
| 2003/0225504 A1 | | 12/2003 | Katayama |
| 2006/0101902 A1 | * | 5/2006 | Christensen ................. 73/116 |

FOREIGN PATENT DOCUMENTS

| EP | 0 473 079 A2 | 3/1992 |
| JP | A 07-259627 | 10/1995 |
| JP | A 08-121235 | 5/1996 |
| JP | A-10-231750 | 9/1998 |
| JP | A 2001-065402 | 3/2001 |
| JP | A 2003-343340 | 12/2003 |

OTHER PUBLICATIONS

Nov. 24, 2009 Search Report issued in European Patent Application No. EP 06834676.6.

* cited by examiner

*Primary Examiner*—Eric S McCall
(74) *Attorney, Agent, or Firm*—Oliff & Berridge, PLC (57) ABSTRACT

When an operating state constituted of a rotation speed Ne and torque Te of an engine belongs in a resonance region in a post-stage including a damper connected to a crankshaft of the engine, a subtraction sine wave for removing an influence by resonance is calculated, and misfire is judged depending on whether or not a variation amount $\Delta F$ of a rotation speed F after processing, obtained by subtracting the calculated subtraction sine wave from a variation in 30-degree rotation speed N30 which is a rotation speed every time the crankshaft rotates by 30 degrees, is less than a threshold value Fref. Thereby, even when the operating state belongs in the resonance region, misfire can be judged more reliably and more accurately.

10 Claims, 6 Drawing Sheets

MISFIRE JUDGING DEVICE OF INTERNAL COMBUSTION ENGINE, VEHICLE MOUNTED WITH IT AND MISFIRE JUDGING METHOD

TECHNICAL FIELD

The present invention relates to a misfire judging device of an internal combustion engine, a vehicle mounted with it and a misfire judging method, and particularly relates to a misfire judging device which judges misfire of an internal combustion engine having a plurality of cylinders with an output shaft connected to a post-stage via a spiral element, a vehicle mounted with the internal combustion engine and the misfire judging device, and a misfire judging method for judging misfire of the internal combustion engine having a plurality of cylinders with the output shaft connected to the post-stage via the spiral element.

BACKGROUND ART

Conventionally, as a misfire judging device of an internal combustion engine of this kind, there is proposed the one that judges misfire of an engine based on a torque correction amount of a motor at the time of vibration control which cancels out the torque variation of the engine by the motor in a vehicle in which a motor capable of generating power is mounted to a crankshaft of the engine (for example, see Patent Document 1). In this device, when vibration control by the motor is not carried out or when the engine is operated with high rotational torque even when the vibration control by the motor is carried out, misfire is judged based on the rotation variation in the crank angle position, and when vibration control by the motor is carried out, and the engine is operated at low rotation or operated with low torque, misfire of the engine is judged based on the torque correction amount of the motor at the time of vibration control.

[Patent Document 1] Japanese Patent Laid-Open No. 2001-65402

DISCLOSURE OF THE INVENTION

When vibration control by the motor is carried out as in the above described device, it is difficult to judge misfire with the conventional misfire judging method, but the factor which makes judgment of misfire difficult is not limited to such vibration control. For example, when the engine is connected to a transmission or the like via a spiral element such as a damper which is used for the purpose of suppressing torque variation of the engine, the whole transmission including the damper resonates depending on the operation point of the engine, and judgment of misfire becomes difficult.

A misfire judging device of an internal combustion engine, a vehicle mounted with it and a misfire judging method of the present invention have an object to more reliably judge misfire of the internal combustion engine connected to a post-stage via a spiral element such as a damper. A misfire judging device of an internal combustion engine, a vehicle mounted with it and a misfire judging method of the present invention have an object to judge misfire of the internal combustion engine connected to a post stage via a spiral element such as a damper with high accuracy.

The misfire judging device of the internal combustion engine, the vehicle mounted with it and the misfire judging method of the present invention have the following configurations to achieve at least part of the above described objects.

The present invention is directed to a misfire judging device judging misfire of an internal combustion engine having a plurality of cylinders with an output shaft connected to a post-stage via a spiral element. The misfire judging device includes: a rotational position detecting module detecting a rotational position of the output shaft of the internal combustion engine; a unit rotation angle rotation speed calculating module calculating a unit rotation angle rotation speed which is a rotation speed of each predetermined unit rotation angle of the output shaft of the internal combustion engine based on the detected rotational position; and a misfire judging module judging whether or not misfire occurs to any of cylinders of the internal combustion engine based on a variation in the rotation speed after calculation obtained by adding or subtracting a sine wave component with a time in which the output shaft of the internal combustion engine rotates 720 degrees as a period, to or from a variation in the calculated unit rotation angle rotation speed, when an operation point of the internal combustion engine belongs in a resonance region in a post-stage including the spiral element.

In the misfire judging device of an internal combustion engine of the present invention, a unit rotation angle rotation speed which is a rotation speed for each predetermined unit rotation angle of the output shaft of the internal combustion engine is calculated based on a rotational position of the output shaft of the internal combustion engine, and when the operation point of the internal combustion engine belongs in the resonance region in the post-stage including the spiral element, it is judged whether or not misfire occurs to any of the cylinders of the internal combustion engine based on the variation in a rotation speed after calculation obtained by adding or subtracting a sine wave component with a time in which the output shaft of the internal combustion engine rotates 720 degrees as the period, to and from the variation in the calculated unit rotation angle rotation speed. Thereby, the influence of the resonance in the post-stage including the spiral element is suppressed, and misfire can be judged more reliably and more accurately.

In the misfire judging device of the internal combustion engine of the present invention as described above, the aforesaid misfire judging module can be made a judging module which judges misfire by using a sine wave component of an amplitude based on output torque from the aforesaid internal combustion engine and characteristics of the aforesaid spiral element. Further, the aforesaid misfire judging module can be made a judging module which judges misfire by using a sine wave component of a phase of which minimum value corresponds to a minimum value of variations in the aforesaid calculated unit rotation angle rotation speed in the period of the sine wave component. By this, misfire can be judged more clearly.

In the misfire judging device of the internal combustion engine of the present invention, the aforesaid misfire judging module can be made a judging module which judges misfire when a variation amount of the rotation speed after calculation is less than a threshold variation amount.

In the misfire judging device of the internal combustion engine of the present invention, the aforesaid misfire judging module can be made a judging module which judges whether or not misfire occurs to any of the cylinders of the internal combustion engine based on the variation in the aforesaid calculated unit rotation angle rotation speed when the operation point of the aforesaid internal combustion engine does not belong in the aforesaid resonance region. By this, even when the operation point of the internal combustion engine does not belong in the resonance region in the post-stage including the spiral element, misfire can be judged more reliably and more accurately.

A vehicle of the present invention aims to be mounted with an internal combustion engine having a plurality of cylinders with an output shaft connected to a transmission mechanism via a damper as a spiral element, and the misfire judging device of the internal combustion engine of the present invention of any one of the above described modes, which judges misfire of the internal combustion engine. Accordingly, the vehicle of the present invention can provide the same effect as the effect provided by the misfire judging device of the internal combustion engine of the present invention, for example, the effect of being able to suppress the influence of resonance in the post-stage including the spiral element and judge misfire more reliably and more accurately, and the like.

The present invention is also directed to a misfire judging method for judging misfire of an internal combustion engine having a plurality of cylinders with an output shaft connected to a post-stage via a spiral element. The misfire judging method includes: calculating a unit rotation angle rotation speed which is a rotation speed of each predetermined unit rotation angle of the output shaft of the internal combustion engine based on a rotational position of the output shaft of the internal combustion engine; and judging whether or not misfire occurs to any of the cylinders of the internal combustion engine based on a variation in a rotation speed after calculation obtained by adding or subtracting a sine wave component with a time in which the output shaft of the internal combustion engine rotates 720 degrees as a period, to and from a variation in the calculated unit rotation angle rotation speed when an operation point of the internal combustion engine belongs in a resonance region in a post-stage including the spiral element.

In the misfire judging method of the internal combustion engine of the invention, a unit rotation angle rotation speed which is a rotation speed for each predetermined unit rotation angle of the output shaft of the internal combustion engine is calculated based on a rotational position of the output shaft of the internal combustion engine, and when the operation point of the internal combustion engine belongs in the resonance region in the post-stage including the spiral element, it is judged whether or not misfire occurs to any of the cylinders of the internal combustion engine based on the variation in a rotation speed after calculation obtained by adding or subtracting a sine wave component with a time in which the output shaft of the internal combustion engine rotates 720 degrees as the period, to and from the variation in the calculated unit rotation angle rotation speed. Thereby, the influence of the resonance in the post-stage including the spiral element is suppressed, and misfire can be judged more reliably and more accurately.

In the misfire judging method of the internal combustion engine of the invention as described above, misfire can be judged by using a sine wave component of an amplitude based on output torque from the internal combustion engine and characteristics of the spiral element. Further, misfire can be judged by using a sine wave component of a phase of which minimum value corresponds to a minimum value of variations in the calculated unit rotation angle rotation speed in the period of the sine wave component. By this, misfire can be judged more clearly.

In the misfire judging method of the internal combustion engine of the invention, it can be judged whether or not misfire occurs to any of the cylinders of the internal combustion engine based on a variation in the calculated unit rotation angle rotation speed when an operation point of the internal combustion engine does not belong in the resonance region. By this, even when the operation point of the internal combustion engine does not belong in the resonance region in the post-stage including the spiral element, misfire can be judged more reliably and more accurately.

BEST MODE FOR CARRYING OUT THE INVENTION

Figure 1:
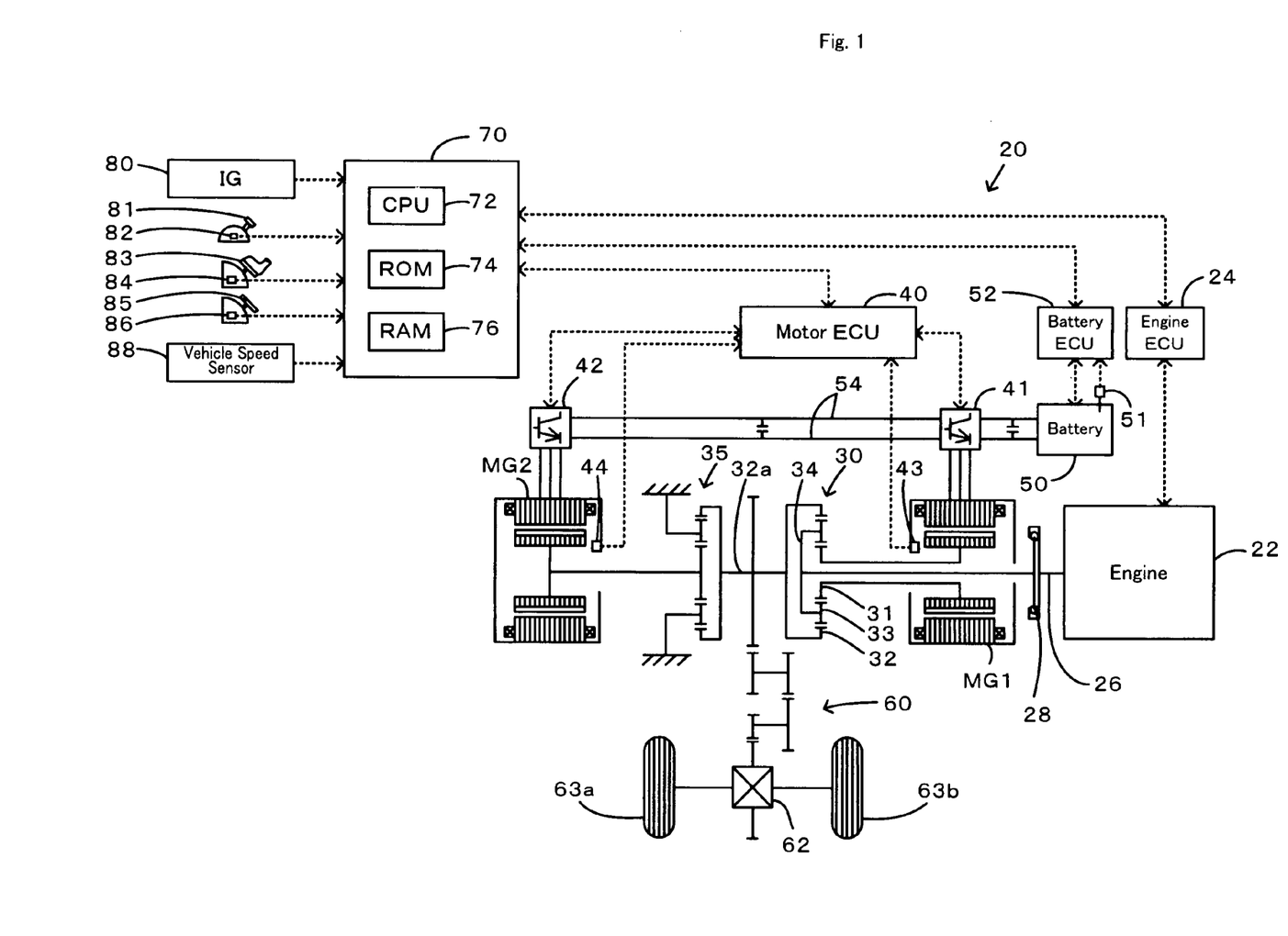
FIG. 1 is a block diagram showing an outline of a constitution of a hybrid automobile 20 which is one embodiment of the present invention.

Next, a best mode for carrying out the present invention will be described by using an embodiment. FIG. 1 is a block diagram showing an outline of a constitution of a hybrid automobile 20 mounted with a misfire judging device of an internal combustion engine which is one embodiment of the present invention. As shown in the drawing, the hybrid automobile 20 of the embodiment includes an engine 22, a three-axle power distribution and integration mechanism 30 connected to a crankshaft 26 as an output shaft of the engine 22 via a damper 28 as a spiral element, a motor MG1 capable of generating power and connected to the power distribution and integration mechanism 30, a reduction gear 35 mounted to a ring gear shaft 32a as a drive shaft connected to the power distribution and integration mechanism 30, a motor MG2 connected to the reduction gear 35, and a hybrid electronic control unit 70 which controls the entire vehicle. Here, as the misfire judging device of the internal combustion engine of the embodiment, an engine electronic control unit 24 mainly controls the engine 22 applies.

Figure 2:
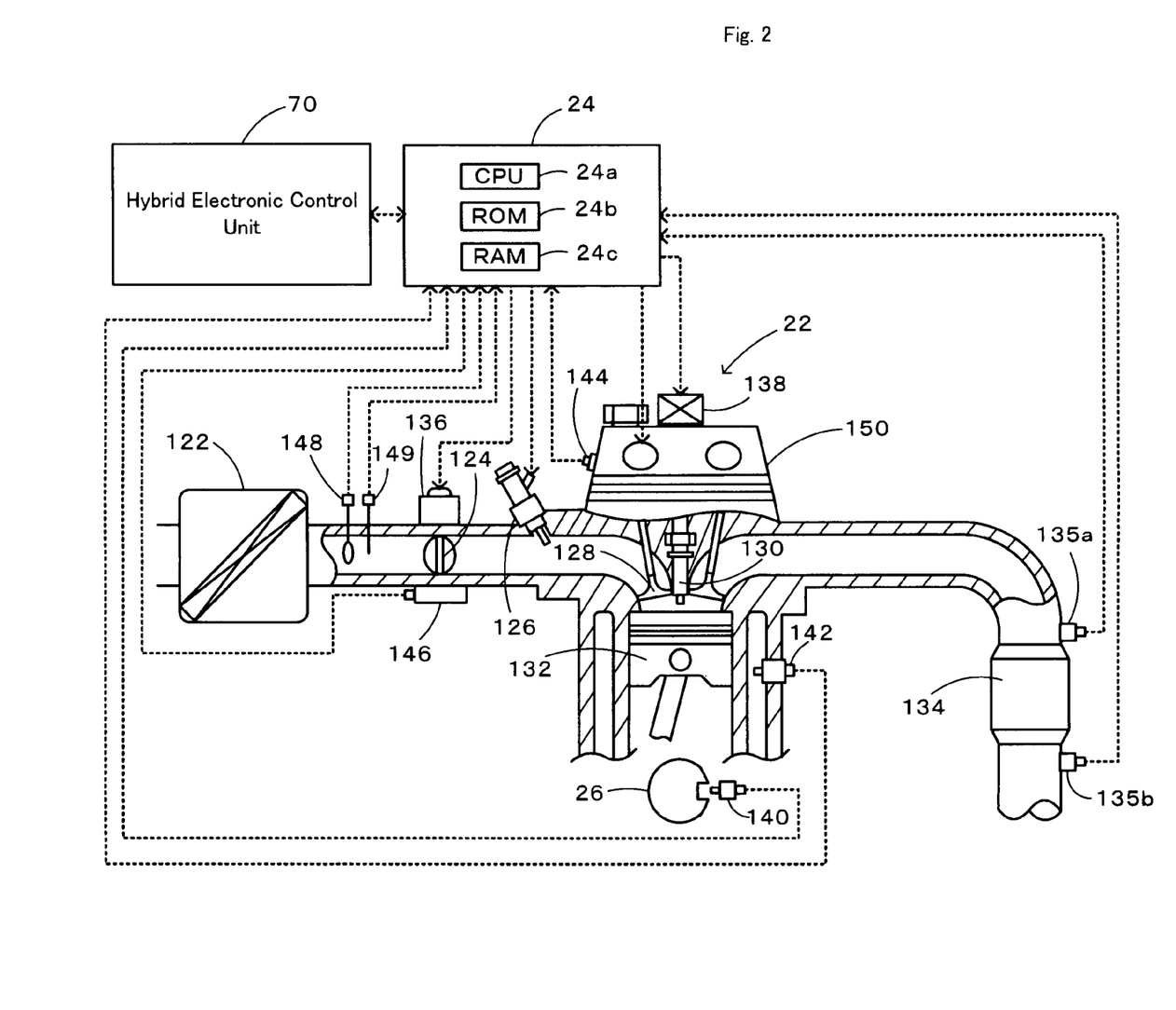
FIG. 2 is a block diagram showing an outline of a constitution of an engine 22.

The engine 22 is constituted as a six-cylinder internal combustion engine capable of outputting power by a hydrocarbon fuel such as gasoline or gas oil, for example, and as shown in FIG. 2, the engine 22 takes in air cleaned by an air cleaner 122 through a throttle valve 124 and injects gasoline from a fuel injection valve 126 provided at each of the cylinders to mix the air taken in and the gasoline, then takes the mixture gas into a fuel chamber through an intake valve 128, explodes and combusts the mixture gas by electric spark by an ignition plug 130, and converts a reciprocating movement of a piston 132 which is pressed down by the energy into rotational movement of the crankshaft 26. The exhaust gas from the engine 22 is exhausted to external air through a purifier (three way catalyst) 134 which purifies injurious ingredients such as carbon monoxide (CO), hydrocarbon (HC) and nitrogen oxide (NOx).

The engine 22 is under control of an engine electronic control unit 24 (hereafter referred to as engine ECU 24). The engine ECU 24 is constructed as a microprocessor including a CPU 24a, a ROM 24b that stores processing programs, a RAM 24c that temporarily stores data, input and output ports (not shown), and a communication port (not shown). The engine ECU 24 receives, via its input port (not shown), signals from various sensors that measure and detect the conditions of the engine 22. The signals input into the engine ECU 24 include a crank position from a crank position sensor 140 detected as the rotational position of the crankshaft 26, a cooling water temperature from a water temperature sensor 142 measured as the temperature of cooling water in the engine 22, a cam position from a cam position sensor 144 detected as the rotational position of a camshaft driven to open and close the intake valve 128 and an exhaust valve for gas intake and exhaust into and from the combustion chamber, a throttle valve position from a throttle valve position sensor 146 detected as the opening or position of the throttle valve 124, an air flow meter signal AF from an air flow meter 148 attached to an air intake conduit, and an intake air temperature from a temperature sensor 149 attached to the air intake conduit, an air-fuel ratio AF from an air-fuel ratio sensor 135a, and an oxygen concentration from an oxygen sensor 135b. The engine ECU 24 outputs, via its output port (not shown), diverse control signals and driving signals to drive and control the engine 22, for example, driving signals to the fuel injection valve 126, driving signals to a throttle valve motor 136 for regulating the position of the throttle valve 124, control signals to an ignition coil 138 integrated with an igniter, and control signals to a variable valve timing mechanism 150 to vary the open and close timings of the intake valve 128. The engine ECU 24 communicates with the hybrid electronic control unit 70. The engine ECU 24 receives control signals from the hybrid electronic control unit 70 to drive and control the engine 22, while outputting data regarding the driving conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors. MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 3:
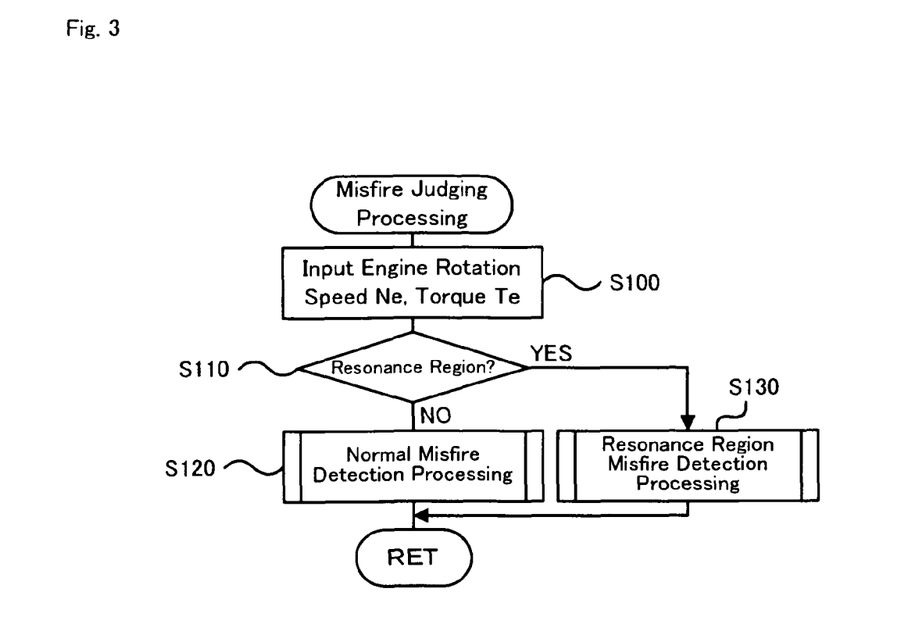
FIG. 3 is a flow chart showing one example of misfire judging processing executed by an engine ECU 24.

Next, an operation when judging whether or not misfire occurs to any of the cylinders of the engine 22 mounted on the hybrid automobile 20 of the embodiment thus constituted will be described. FIG. 3 is a flow chart showing an example of a misfire judging processing routine executed by the engine ECU 24. The routine is repeatedly executed every predetermined time.

When the misfire judging processing is executed, a CPU 24a of the engine ECU 24 first inputs therein a rotation speed Ne and torque Te of the engine 22 (step S100), and executes processing of judging whether or not an operating state of the engine 22 belongs in a resonance region of a post-stage (power distribution and integration mechanism 30 and the like) including the damper 28 based on the input rotation speed Ne and the torque Te (step S110). Here, in the embodiment, as the rotation speed Ne of the engine 22, the one which is found by calculation based on a crank angle CA from a crank position sensor 140 is inputted, and as the torque Te, the one calculated from a torque command Tm1* of the motor MG1 and the rotation speed Ne of the engine 22 is inputted. Whether the operating state of the engine 22 belongs in the resonance region in the post-stage including the damper 28 or not is judged by obtaining the rotation speed Ne and the torque Te of the engine 22 which belong in the resonance region by an experiment or the like in advance and storing them as a resonance operation range in a ROM 24b, and by judging whether or not the input rotation speed Ne and torque Te of the engine 22 belong in the stored resonance operation range. The resonance operation range can be obtained by an experiment by the characteristics of the engine 22 and the characteristics of the post-stage (power distribution and integration mechanism 30) from the damper 28, and the like.

Figure 4:
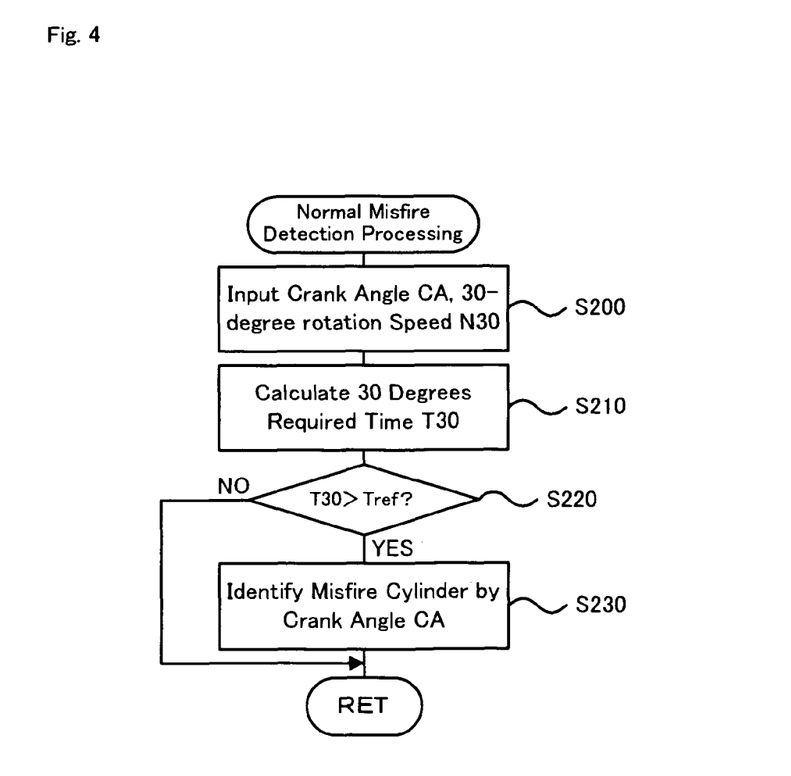
FIG. 4 is a flowchart showing one example of normal-time misfire detection processing.
Figure 5:
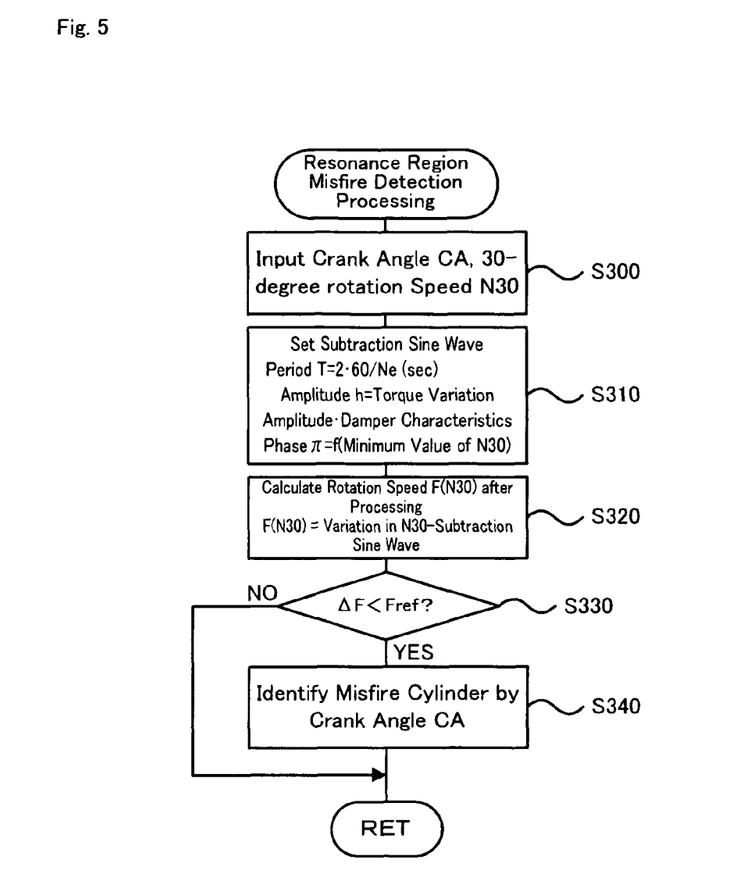
FIG. 5 is a flowchart showing one example of resonance region misfire detection processing.

When it is judged that the operating state of the engine 22 does not belong in the resonance region in the post-stage including the damper 28 in step S110, misfire detection of whether or not misfire occurs to any of the cylinders of the engine 22 is performed by normal misfire detection processing shown in FIG. 4 as an example (step S120), and when it is judged that the operating state of the engine 22 belongs in the resonance region in the post-stage including the damper 28, misfire detection of whether or not misfire occurs to any of the cylinders of the engine 22 is performed by resonance region misfire detection processing shown in FIG. 5 as an example (step S130) to finish the misfire judging processing.

Figure 6:
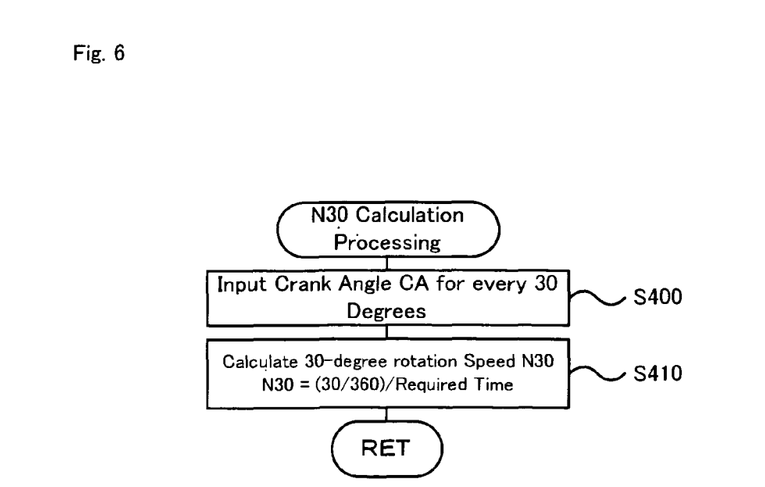
FIG. 6 is a flowchart showing one example of calculation processing of a 30-degree rotation speed N30.
Figure 7:
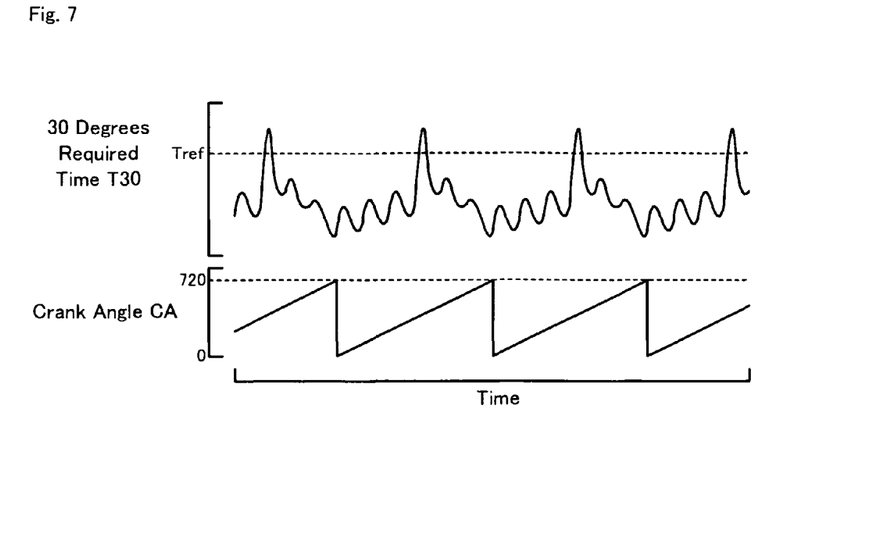
FIG. 7 is an explanatory view showing one example of change with time of a 30-degree rotation required time T30 and a crank angle CA of the engine 22 in which misfire occurs to one cylinder when the operating state of the engine 22 does not belong in a resonance region.

In the normal misfire detection processing in FIG. 4, the CPU 24a first inputs therein the crank angle CA detected by the crank position sensor 140, and inputs therein 30-degree rotation speed N30 which is the rotation speed for every 30 degrees of the crank angle CA calculated by N30 calculation processing shown in FIG. 6 as an example (step S200). The CPU 24a calculates the 30-degree rotation required time T30 which is required for the crankshaft 26 to rotate 30 degrees by taking the inverse of the input 30-degree rotation speed N30 (step S210). Here, as shown in the N30 calculation processing, the CPU 24a calculates the 30-degree rotation speed N30 by inputting therein the crank angle CA at every 30 degrees from the crank angle which is the reference (step S400), and by dividing 30 degrees by the time required for rotating 30 degrees (step S410). Next, the CPU 24a judges whether or not the 30-degree rotation required time T30 is larger than a threshold value Tref (step S220). When the 30-degree rotation required time T30 is larger than the threshold value Tref, the CPU 24a judges that misfire occurs, identifies the cylinder to which the misfire occurs based on the input crank angle CA (step S230), and finishes the normal misfire detection processing. Here, the threshold value Tref is set as a value which is larger than the 30-degree rotation required time T30 when misfire does not occur to the cylinder in the combustion stroke at the crank angle CA which is the reference of the 30-degree rotation required time T30 and is smaller than the 30-degree rotation required time T30 when misfire occurs to that cylinder, and can be obtained by an experiment or the like. The cylinder to which misfire occurs can be identified as the cylinder which is in the combustion stroke at the crank angle CA which is the reference of the 30-degree rotation required time T30 exceeding the threshold value Tref. FIG. 7 shows an example of change with time of the 30-degree rotation required time T30 of the engine 22 in which misfire occurs to one cylinder when the operating state of the engine 22 does not belong in the resonance region and the crank angle CA. As shown in the drawing, the 30-degree rotation required time T30 exceeds the threshold value Tref at the rate of once every 720 degrees of the crank angle CA. When the 30-degree rotation required time T30 is the threshold value Tref or less, it is judged that misfire does not occur, and the normal misfire detection processing is finished.

In the resonance region misfire detection processing in FIG. 5, the CPU 24a first inputs therein the crank angle CA detected by the crank position sensor 140, and inputs therein the 30-degree rotation speed N30 which is the rotation speed of the crank angle CA at every 30 degrees calculated by the N30 calculation processing shown in FIG. 6 as an example (step S300). Then, a subtraction sine wave for removing the influence by resonance of the post-stage including the damper 28 from the 30-degree rotation speed N30 is set (step S310), and the rotation speed F(N30) after processing is obtained by subtracting the subtraction sine wave which is set for a variation in the 30-degree rotation speed N30 (step S320). The reason of subtracting the subtraction sine wave from the 30-degree rotation speed N30 is to remove the influence of the resonance of the post-stage including the damper 28 from the 30-degree rotation speed N30. Here, the period of the subtraction sine wave is the period of the resonance frequency when misfire occurs to one cylinder, and can be calculated as the period of misfire, that is, the period of the time required for the crankshaft 26 to rotate 720 degrees (period corresponding to half the frequency of the rotation speed Ne of the engine 22), and an amplitude h of the subtraction sine wave can be calculated as the one obtained by multiplying the amplitude of the torque variation of the engine 22 by the torsion characteristic of the damper 28. A phase $\pi$ of the subtraction sine wave can be obtained so that the minimum peak of the 30-degree rotation speed N30 corresponds to the minimum value of the sine wave in the range of the crank angle CA of 720 degrees.

Figure 8:
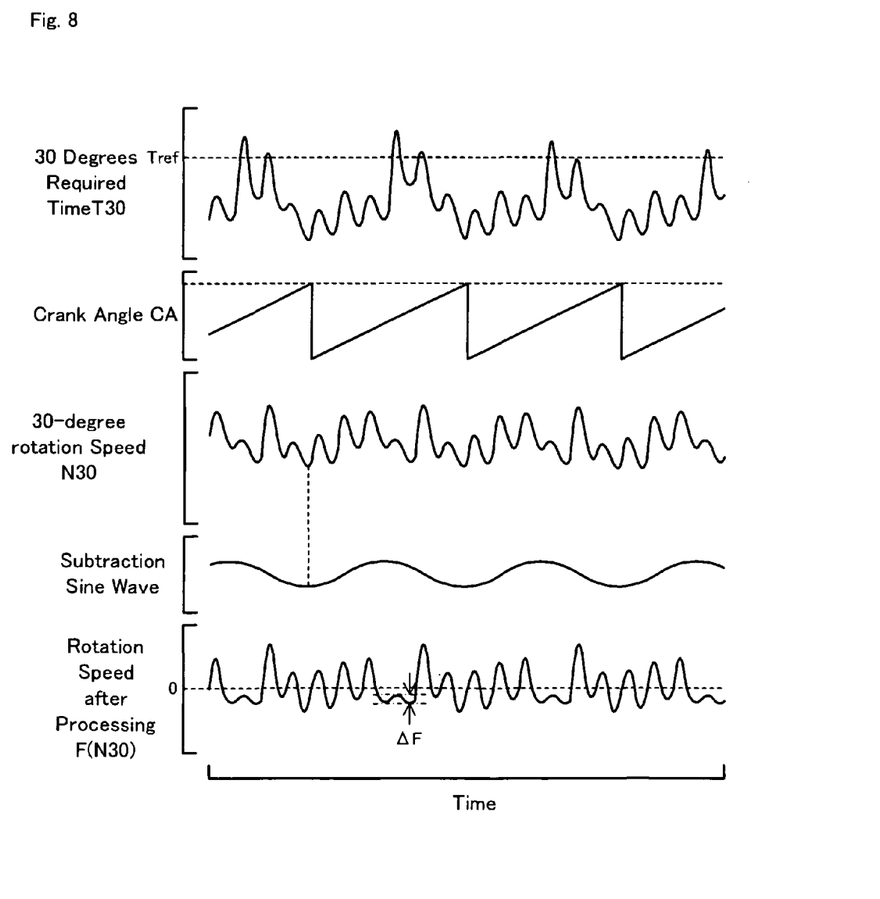
FIG. 8 is an explanatory view showing one example of change with time of the 30-degree rotation required time T30, the crank angle CA, the 30-degree rotation speed N30, a subtraction sine wave and a rotation speed F(N30) after processing of the engine 22 in which misfire occurs to one cylinder when the operating state of the engine 22 belongs in the resonance region.

Subsequently, the CPU 24a judges whether or not a variation amount $\Delta F$ which is the difference between the trough and the crest in the change of the rotation speed F(N30) after processing is less than a set threshold value Fref (step S330), when the variation amount $\Delta F$ is less than the threshold value Fref, the CPU 24a judges that misfire occurs, identifies the cylinder to which the misfire occurs based on the input crank angle CA (step S340), and finishes the resonance region misfire detection processing. Here, the threshold value Fref is set as a value which is smaller than the variation amount of the rotation speed F(N30) after processing when misfire does not occur to the cylinder which is in the combustion stroke at the crank angle CA that is the reference of the 30-degree rotation speed N30, and is larger than the variation amount of the rotation speed F(N30) after processing when misfire occurs to that cylinder, and can be obtained by an experiment or the like. FIG. 8 shows an example of change with time of each of the 30-degree rotation required time T30, the crank angle CA, the 30-degree rotation speed N30, the subtraction sine wave and the rotation speed F(N30) after processing of the engine 22 in which misfire occurs to one cylinder when the operating state of the engine 22 belongs in the resonance region. As shown in the drawing, the influence by resonance is removed from the rotation speed F(N30) after processing, and misfire is favorably detected. When the variation amount $\Delta F$ in the rotation speed F(N30) after processing is the threshold value Fref or less, it is judged that misfire does not occur and the resonance region misfire detection processing is finished.

According to the misfire judging device of an internal combustion engine mounted on the hybrid automobile 20 of the embodiment described above, when the operating state of the engine 22 belongs in the resonance region of the post-stage including the damper 28, misfire is judged depending on whether or not the variation amount $\Delta F$ in the rotation speed F(N30) after processing obtained by subtracting the subtraction sine wave for removing the influence by resonance from the change in the 30-degree rotation speed N30 is less than the threshold value Fref, and therefore, even when the operating state belongs in the resonance region, misfire can be judged more reliably and more accurately.

According to the misfire judging device of an internal combustion engine mounted on the hybrid automobile 20 of the embodiment, misfire is judged by the normal-time misfire detection processing when the operating state of the engine 22 does not belong in the resonance region in the post-stage including the damper 28, and misfire is judged by the resonance region misfire detection processing differing from the normal-time misfire detection processing when the operating state of the engine 22 belongs in the resonance region in the post-stage including the damper 28. Therefore, when the operating state of the engine 22 does not belong in the resonance region in the post-stage including the damper 28, and when it belongs in the resonance region, misfire can be judged more reliably and more accurately.

In the misfire judging device of an internal combustion engine mounted in the hybrid automobile 20 of the embodiment, when the operating state of the engine 22 does not belong in the resonance region in the post-stage including the damper 28, misfire is judged by adopting the normal-time misfire detection processing as the processing of judging misfire depending on whether or not the 30-degree rotation required time T30 is larger than the threshold value Tref, but the processing is not limited to the misfire detection based on the 30-degree rotation required time T30, and misfire may be judged by adopting another misfire detection processing as the normal-time misfire detection processing.

Figure 9:
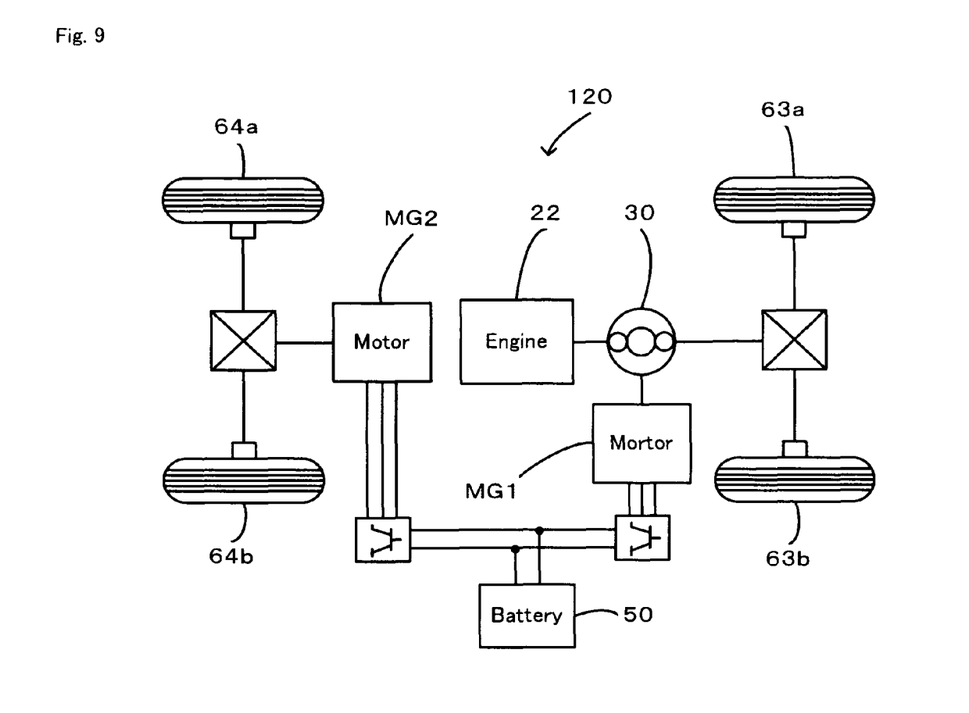
FIG. 9 is a block diagram showing an outline of a constitution of a hybrid automobile 120 of a modified example.
Figure 10:
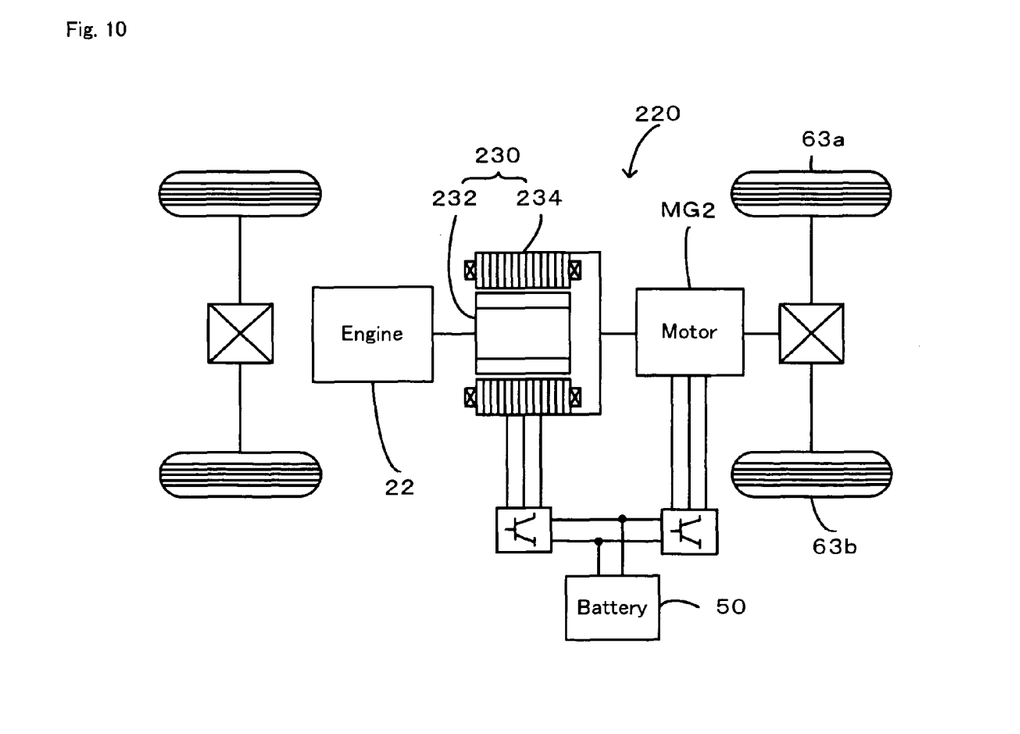
FIG. 10 is a block diagram showing an outline of a constitution of a hybrid automobile 220 of a modified example.

In the hybrid automobile 20 of the embodiment, the misfire judging device is adopted as the misfire judging device of the engine 22 in the system including the power distribution and integration mechanism 30 connected to the crankshaft 26 of the engine 22 via the damper 28 as the spiral element and connected to the ring gear shaft 32a as the rotating shaft and the drive shaft of the motor MG1, and the motor MG2 connected to the ring gear shaft 32a via the reduction gear 35, but it may be adopted in any system in which the crankshaft of the engine is connected to the post-stage via the damper as the spiral element, and therefore, as shown as an example in a hybrid automobile 120 of a modified example in FIG. 9, it may be adopted as the misfire judging device of the engine 22 of the system in which the power of the motor MG2 is connected to an axle (axle connected to the wheels 64a and 64b in FIG. 9) different from the axle (axle to which the drive wheels 63a and 63b are connected) to which the ring gear shaft 32a is connected, or as shown as an example in a hybrid automobile 220 of a modified example of FIG. 10, the misfire judging device may be adopted as the misfire judging device of the engine 22 of the system including a pair-rotor motor 230 which has an inner rotor 232 connected to the crankshaft 26 of the engine 22 via the damper 28 and an outer rotor 234 connected to the drive shaft outputting power to the drive wheels 63a and 63b, and transmits part of the power of the engine 22 to the drive shaft and converts the residual power into electric power.

The present invention is not limited to the devices for judging misfire of the internal combustion engines mounted on such hybrid automobiles, but may be adopted as the misfire judging device of an internal combustion engine which is mounted in a movable body or the like other than automobiles, and an internal combustion engine incorporated into equipment which does not move such as construction equipment. It may be adopted as the mode of the misfire judging method of an internal combustion engine.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

INDUSTRIAL APPLICABILITY

The present invention can be used for manufacturing industry and the like of systems in which internal combustion engines are incorporated and automobiles mounted with internal combustion engines.

The invention claimed is:

1. A misfire judging device judging misfire of an internal combustion engine having a plurality of cylinders with an output shaft connected to a post-stage via a spiral element, said misfire judging device comprising:
   a rotational position detecting module detecting a rotational position of the output shaft of said internal combustion engine;
   a unit rotation angle rotation speed calculating module calculating a unit rotation angle rotation speed which is a rotation speed of each predetermined unit rotation angle of the output shaft of said internal combustion engine based on said detected rotational position; and
   a misfire judging module judging whether or not misfire occurs to any of cylinders of said internal combustion engine based on a variation in the rotation speed after calculation obtained by adding or substracting a sine wave component with a time in which the output shaft of said internal combustion engine rotates 720 degrees as a period, to or from a variation in said calculated unit rotation angle rotation speed, when an operation point of said internal combustion engine belongs in a resonance region in a post-stage including said spiral element.

2. A misfire judging device according to claim 1, wherein said misfire judging module is a judging module which judges misfire by using a sine wave component of an amplitude based on output torque from said internal combustion engine and characteristics of said spiral element.

3. A misfire judging device according to claim 1, wherein said misfire judging module is a judging module which judges misfire by using a sine wave component of a phase of which minimum value corresponds to a minimum value of variations in said calculated unit rotation angle rotation speed in the period of the sine wave component.

4. A misfire judging device according to claim 1, wherein said misfire judging module is a judging module which judges misfire when a variation amount of said rotation speed after calculation is less than a threshold variation amount.

5. A misfire judging device according to claim 1, wherein said misfire judging module is a judging module which judges whether or not misfire occurs to any of the cylinders of the internal combustion engine based on a variation in said calculated unit rotation angle rotation speed when an operation point of said internal combustion engine does not belong in said resonance region.

6. A vehicle comprising an internal combustion engine having a plurality of cylinders with an output shaft connected to a transmission mechanism via a damper as a spiral element, and a misfire judging device which judges misfire of said internal combustion engine, said misfire judging device which judges misfire of said internal combustion engine, said misfire judging device comprising:
   a rotation position detecting module detecting a rotational position of the output shaft of said internal combustion engine;
   a unit rotation angle rotation speed calculating module calculating a unit rotation angle rotation speed which is a rotation speed of each predetermined unit rotation angle of the output shaft of said internal combustion engine based on said detected rotational position; and
   a misfire judging module judging whether or not misfire occurs to any of cylinders of said internal combustion engine based on a variation in the rotation speed after calculation obtained by adding or substracting a sine wave component with a time in which the output shaft of said internal combustion engine rotates 720 degrees as a period, to or from a variation in said calculated unit rotation angle rotation speed, when an operation point of said internal combustion engine belongs in a resonance region in a post-stage including said spiral element.

7. A misfire judging method for judging misfire of an internal combustion engine having a plurality of cylinders with an output shaft connected to a post-stage via a spiral element,
   said misfire judging method comprising:
   calculating a unit rotation angle rotation speed which is a rotation speed of each predetermined unit rotation angle of the output shaft of said internal combustion engine based on a rotational position of the output shaft of the internal combustion engine; and
   judging whether or not misfire occurs to any of the cylinders of said internal combustion engine based on a variation in a rotation speed after calculation obtained by adding or subtracting a sine wave component with a time in which the output shaft of said internal combustion engine rotates 720 degrees as a period, to and from a variation in said calculated unit rotation angle rotation speed when an operation point of said internal combustion engine belongs in a resonance region in a post-stage including said spiral element.

8. A misfire judging method according to claim 7, wherein misfire is judged by using a sine wave component of an amplitude based on output torque from said internal combustion engine and characteristics of said spiral element.

9. A misfire judging method according to claim 7, wherein misfire is judged by using a sine wave component of a phase of which minimum value corresponds to a minimum value of variations in said calculated unit rotation angle rotation speed in the period of said sine wave component.

10. A misfire judging method according to claim 7, wherein it is judged whether or not misfire occurs to any of the cylinders of the internal combustion engine based on a variation in said calculated unit rotation angle rotation speed when an operation point of said internal combustion engine does not belong in said resonance region.

* * * * *